Figure 1:
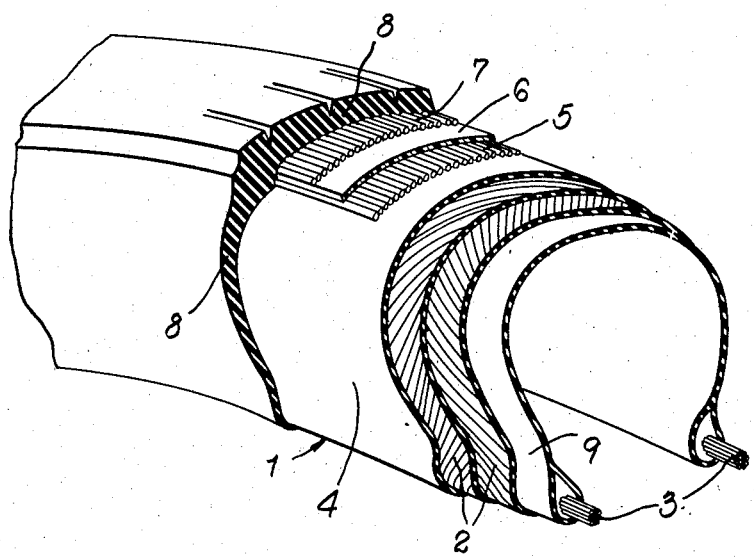

March 11, 1958 D. H. D'O. COOPER 2,826,233
PNEUMATIC TIRES
Filed July 9, 1953 2 Sheets-Sheet 1

INVENTOR.
DAVID HENRY D'OYLY COOPER
BY
*Benj. T. Pauber*
ATTORNEY

March 11, 1958   D. H. D'O. COOPER   2,826,233
PNEUMATIC TIRES
Filed July 9, 1953   2 Sheets-Sheet 2

INVENTOR.
DAVID HENRY DOYLY COOPER
BY
ATTORNEY

2,826,233
PNEUMATIC TIRES

David Henry D'Oyly Cooper, Acocks Green, Birmingham, England, assignor to Dunlop Tire and Rubber Corporation, Buffalo, N. Y., a corporation of New York Application July 9, 1953, Serial No. 367,033

6 Claims. (Cl. 152—361)

My invention relates to pneumatic tires.

It has been established, heretofore, that a considerable proportion of tread wear is caused by the movement which takes place within the tread rubber during running, particularly upon cornering, and which causes abrasive wear of the tire tread against the ground surface. When the steered wheels of a vehicle fitted with conventional tires are turned so as to alter the direction of movement of the vehicle the flattened ground-contacting portions of the treads tend, owing to their flexibility and to their grip on the ground surface, to maintain their orientation relative to the road despite the turning of the wheels. The remainder of the treads are thereby twisted out of alignment with the ground-contacting portions until alignment of the tread portions takes place.

A considerable amount of tread wear is caused by this movement and distortion, the amount being dependent upon the speed of axial tire rotation and the rate of cornering and it has been proposed heretofore to increase the resistance of tire treads to twisting in a plane containing the flattened ground-contacting portion of a loaded tire tread by reinforcing the tread with rigid material incorporated in the cover and located between the carcass and the running surface of the tread.

My present invention provides a pneumatic tire cover having a rigidly reinforced tread which is more effective than previously proposed covers in limiting the tread movement referred to and thus reducing tread wear.

According to the present invention a pneumatic tire cover has a circumferentially extending tread reinforcement incorporated in the cover and located between the carcass and the running surface of the tread which comprises a circumferentially extending ply of steel cords coated with a resilient material, the cords being mutually parallel and disposed at from 0° to 30° to the median plane, and at least one circumferentially extending sheet adjacent to and substantially co-extensive with the steel cord layer, the said sheet being made of a synthetic organic polymer of high molecular weight and having a substantially greater shear and tensile strength than that of the tread rubber.

In one type of construction the tread reinforcement comprises two circumferentially extending adjacent layers of steel cord ply, the cords in each layer being parallel and inclined at from 5° to 30° to the median plane. The inclination in one layer with respect to the median plane is opposite to that in the other layer. The circumferentially extending sheet may be located above, below or between the layers of steel cord ply. The carcass itself preferably comprises two layers of rubberized textile cords, the cords in one layer being inclined in an opposite direction to the cords in the other layer the said cords making an angle of from 70° to 90° with the median plane.

Figure 2:
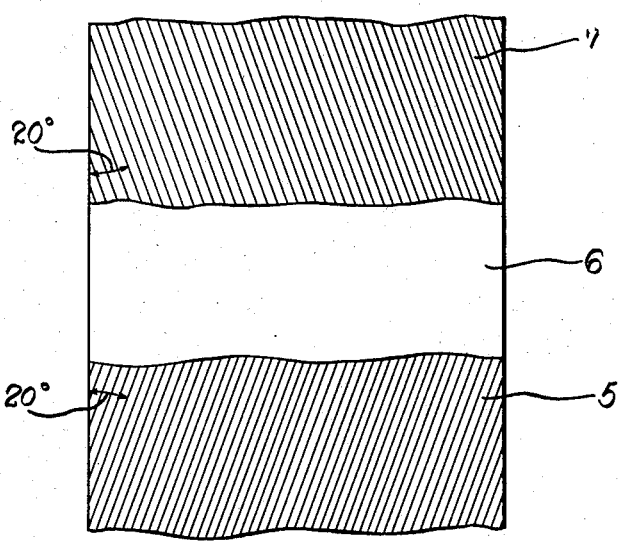
Figure 3:
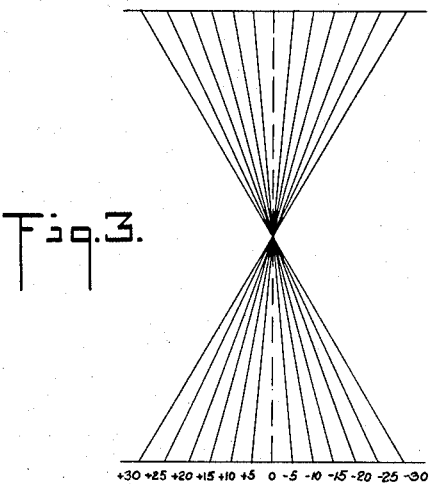

The various features of my invention are illustrated, by way of example, in the accompanying drawings, in which, Fig. 1 is a section of a tire embodying a preferred form of the invention, having successive layers cut away to show breaker construction and cord;

Fig. 2 is a diagrammatic plan of a modified arrangement of the breaker construction, and Fig. 3 is a diagrammatic illustration to show the range of variation in angles of wire in the breaker construction.

The tire, shown in Fig. 1, comprises a lightweight carcass 1 made up of a rubber foundation sheet 9 and of two layers of rubberized textile cords 2 wrapped around a pair of tire beads 3 in the usual manner, the cords in each layer being mutually parallel and inclined in the opposite direction to the cords in the other layer, both sets of cords making an angle of 80° with the tire beads. A sheet of rubber 4 is wrapped circumferentially around the crown of the carcass and a single layer of mutually parallel rubberized steel cords 5 is wrapped circumferentially around the crown and over the rubber sheet. A sheet of nylon 6, having a substantially greater shear and tensile strength than that of the tread rubber which is later applied, is wrapped circumferentially over the steel cord winding.

A second layer of mutually parallel rubberized steel cords 7 is wrapped circumferentially around the crown so as to sandwich the sheet 6 between two layers of steel cord. A conventional rubber tread and sidewall 8 is then applied to the carcass and the whole assembly vulcanized.

As already stated, the carcass is made up of two layers of textile cords inclined at an angle of 80° to the median plane of the tire, the inclination of the cords at such a steep angle ensures that the carcass side-walls and thus the side-walls of the tire into which the carcass is built are very flexible.

The sheet may, as stated above, be made of nylon or alternatively of the synthetic polymer sold under the registered trademark "Terylene" which is a polyethylene glycol terephthalate. The modulus of rigidity of the sheet should be within the range 30,000 to 700,000 pounds per square inch, the corresponding tensile modulus of the sheet being within the range 100,000 to 2,000,000 pounds per square inch.

In the embodiment just described the circumferentially extending layers of steel cords (5 and 7) may be wound helically from a continuous length of steel cord or from two or more lengths.

Although in the previous embodiment the steel cords are disposed circumferentially around the tire crown, i. e. at 0° to the median plane, in alternative constructions the cords may be inclined at any other angle between 0° and 30° relative to the median plane.

When the reinforcement is made up from plies each comprising a plurality of parallel short lengths of rubberized steel cord extending from one side of the tire to the other, it is preferred to dispose the steel cords at an angle of approximately 20° to the median plane of the tire.

Such a construction is shown in Fig. 2, in which one layer of parallel steel cords is laid at an angle of 20° to the median line of the tire, a sheet of nylon 6 is placed on this layer and then a second layer of parallel steel cords 7 is laid on the nylon sheet at an angle of 20° in the opposite or reverse relation to the inclination of the steel cords 5, Fig. 3 indicates the limits of the inclination of the steel cords.

In the embodiment described a sheet is sandwiched between two layers of steel cords. An additional layer or layers of cords may, however, be provided in accordance with the invention with or without plastic separating sheets. As a further alternative a separating sheet or sheets may be located between a steel cord layer and the carcass or between a steel cord layer and the tread.

A tire in accordance with the present invention provides a rigid tread which serves to restrict circumferential and lateral extension of the tread during running and, in addition, limits the shearing action set up in the tread rubber during cornering. Thus, the tread wear is reduced and the life of the tire increased.

The circumferentially extending steel cords provide two substantially impenetrable layers which serve to protect an associated inner tube from puncture.

Having described my invention, what I claim is:

1. A pneumatic tire cover having a circumferentially extending tread reinforcement incorporated in the cover and located between the carcass and the running surface of the tread, said reinforcement comprising a circumferentially extending ply made of steel cords coated with a resilient material, the cords being mutually parallel and disposed at from 0° to 30° to the median plane, and at least one circumferentially extending flexible, continuous sheet adjacent to and substantially co-extensive with the steel cord layer, the said sheet being made of a synthetic organic polymer of high molecular weight and having a modulus of rigidity within the range of 30,000 to 700,000 pounds per square inch and a modulus of elasticity within the range of 100,000 to 2,000,000 pounds per square inch.

2. A pneumatic tire cover according to claim 1 having two circumferentially extending plies of steel cords coated with a resilient material, the cords in each layer being parallel and inclined at from 5° to 30° to the median plane of the tire, the inclination in one layer with respect to the median plane being opposite to that in the other layer.

3. A pneumatic tire according to claim 2 wherein the sheet having a modulus of rigidity within the range of 30,000 to 700,000 pounds per square inch and a modulus of elasticity within the range of 100,000 to 2,000,000 pounds per square inch is located between the steel cord plies.

4. A pneumatic tire according to claim 1 having two steel cord plies, the cords comprising the said plies being helically wound and disposed at substantially 0° to the median plane of the tire.

5. A pneumatic tire according to claim 2 wherein a sheet having a substantially greater shear and tensile strength than that of the tread rubber is located between the steel cord plies.

6. A pneumatic tire according to claim 1 wherein the carcass comprises two layers of rubberized textile cords, the cords in one layer being inclined in an opposite direction to the cords in the other layer, said cords making an angle of from 70° to 90° with the tire median plane.

References Cited in the file of this patent

UNITED STATES PATENTS

| | | |
|---|---|---|
| 1,188,062 | Gammeter | June 20, 1916 |
| 1,579,817 | Keith | Apr. 6, 1926 |
| 2,493,614 | Bourdon | Jan. 3, 1950 |
| 2,541,506 | Cuthbertson et al. | Feb. 13, 1951 |

FOREIGN PATENTS

| | | |
|---|---|---|
| 677,166 | Great Britain | Aug. 13, 1952 |

OTHER REFERENCES

Handbook of Plastics, 2d ed., by Simonds, et al., published by D. Van Nostrand Co., Inc. (New York 1949), page 80 relied on.

"The Vanderbilt Rubber Handbook," published by R. T. Vanderbilt Co. (New York) 1948, pages 60 and 161 relied on.